United States Patent [19]

Kitayama et al.

[11] Patent Number: 5,525,676
[45] Date of Patent: Jun. 11, 1996

[54] PRIMER COMPOSITIONS FOR PRETREATMENT OR FITTING OF COATINGS AND PROCESSES FOR TREATING THEM

[75] Inventors: Minoru Kitayama, Tokyo; Harumi Morifusa, Moriyama; Katsumi Kondoh, Kusatsu, all of Japan

[73] Assignee: Chugoku Marine Paints, Ltd., Hiroshima, Japan

[21] Appl. No.: 314,580

[22] Filed: Sep. 28, 1994

Related U.S. Application Data

[63] Continuation of Ser. No. 931,645, Aug. 17, 1992, abandoned, which is a continuation of Ser. No. 679,982, Apr. 3, 1991, abandoned, which is a division of Ser. No. 412,701, Sep. 26, 1989, abandoned.

[30] Foreign Application Priority Data

Nov. 7, 1988 [JP] Japan ................... 63-278557
Jan. 19, 1989 [JP] Japan ..................... 1-8712
May 12, 1989 [JP] Japan ..................... 1-11571

[51] Int. Cl.$^6$ .................... C08L 23/28; C08L 31/04
[52] U.S. Cl. ............... 525/240; 525/221; 525/222; 525/301; 525/334.1; 430/536
[58] Field of Search .................... 525/301, 240, 525/221, 222, 334.1; 430/536

[56] References Cited

U.S. PATENT DOCUMENTS

| | | | |
|---|---|---|---|
| 3,676,391 | 7/1972 | De Ross | 525/222 |
| 3,896,067 | 7/1975 | Kosaka et al. | 525/74 |
| 4,762,882 | 8/1988 | Okano et al. | 525/74 |
| 4,863,988 | 9/1989 | Inagaki | 525/64 |
| 4,889,762 | 12/1989 | Uchiyama et al. | 428/423.7 |

FOREIGN PATENT DOCUMENTS

| | | | |
|---|---|---|---|
| 2179877 | 12/1973 | France | 525/301 |
| 53-141390 | 12/1978 | Japan | 525/301 |
| 60-13807 | 1/1985 | Japan | 525/301 |

OTHER PUBLICATIONS

Encyclopedia of Polymer Science & Engineering, vol. 4, pp. 418–419 & 421. (1985).

*Primary Examiner*—W. Robinson H. Clark
*Attorney, Agent, or Firm*—Jordan and Hamburg

[57] ABSTRACT

A thermal treatment process uses far infrared rays to heat an applied primer composition which has an excellent bonding ability to materials such as polyethylene, polypropylene and synthetic rubbers and is easily bonded to functional coatings. A composite layer of a coating and the primer composition having a function of addition is formed on the surface of these materials by coating or the like, and the composite layer is then subjected to a thermal treatment using far infrared rays. A composition is employed which is suitable for such uses wherein a polymer of an unsaturated dicarboxylic acid and a polyolefin or a chlorine denatured product thereof is used as a main component and a chlorosulfonated polyethylene is applied to improve heat resistance.

27 Claims, No Drawings

PRIMER COMPOSITIONS FOR PRETREATMENT OR FITTING OF COATINGS AND PROCESSES FOR TREATING THEM

This application is a continuation of application Ser. No. 07/931,645 filed Aug. 17, 1992, which is a continuation of Ser. No. 07/679,982 filed Apr. 3, 1991 which is a divisional of Ser. No. 07/412,701, filed Sep. 26, 1989, and of which are now abandoned.

BACKGROUND OF THE INVENTION

Polyethylenes have hitherto been developed as inexpensive engineering plastics such as high strength products, super high molecular weight products or the like, although it was impossible to coat or print paints or inks directly on them because of their non-polarity and extreme inertness and thus it was difficult to expand their application field in spite of their high performance and their low cost.

The high density polyethylene has hitherto been used in wide range of applications owing to its excellent physical properties and low cost. However, the high density polyethylene will be crystallized promptly by ultraviolet rays and deteriorated by crackings, so that it is not suitable for use in the open.

Therefore, polyethylenes reinforced with carbon or an anti-aging agent are placed on the market, but the powers of carbon or an anti-aging agent are limited and such a product has a black appearance and a limited use. Accordingly, a coating technique of polyethylene products has been researched for the purpose of obtaining an effective means for not only improving the appearance of articles by their decorative finishing but also extensively improving the field durability by screening ultraviolet rays.

However, polyethylene comprises absolutely a non-polar molecular structure and has no surface activity, so that it cannot be coated without special surface treatments.

As the surface treatment method which has hitherto been used most generally, there is a method in which the surface layer is oxidized with flame, arcing or a strong oxidizing agent and next coated with a topcoat.

However, such a treatment method is not suitable for practical use, since it is a method in which it is difficult to maintain a constant adhesion due to the uneven treatment state and which is dangerous due to the high toxicity. As for the liquid primers for adhering polyethylene, the effectiveness of primers such as aminosilane, organic titanium, organic aluminium and the like is well known, but these primers are sensitive to humidity (and reactive rapidly with humidity) and it is required to coat thereon with a topcoat (or an organic adhesive of a cyanoacrylate type) (or to apply an adhesive) within a very short time of a few minutes, so that they cannot be applied at all in use for a large area as in the case of paintings.

Furthermore, rubber requires additionally other properties depending on portions or time to be applied with the use of stretchability as an elastomer. As the synthetic rubbers, there are mentioned a variety of rubbers of a heat resistant type, an oil resistant type, a weatherable type, an energy saving type, a highly functionalized special type and the like which correspond to these requirements. In particular, basic requirements for the tires of automobiles are safety and long-term durability, and molecules of a butadiene rubber, a styrene-butadiene rubber, an isoprene rubber and natural rubbers have been respectively designed according to the requirements for tires.

That is to say, one of the natural rubbers or a variety of synthetic rubbers is selected and incorporated with additives such as a vulcanizing agent, a vulcanization accelerator, an anti-aging agent, a reinforcing agent, a filler and a softener in consideration of their combination. For example, in order to improve weatherability, a rubber having fewer unsatisfied bonds is selected, and to the one having inferior vulcanizability are added the third components. In order to improve weatherability, carbon black may be added as a reinforcing agent.

However, these properties may be contrary to each other and often must be controlled by a compromise of each other.

Most of the synthetic rubbers have intrinsically unsaturated bonds, and thus they have essentially problems of weatherability, ozone resistance or the like. Therefore, these problems cannot be completely solved by designing the mixture of materials. The solution by admixture will always bring about secondary defects. For instance, the color of a material is limited to black by the addition of carbon black, and such a limitation is not desirable given the colorful fashion of various life modes of the day.

SUMMARY OF THE INVENTION

The present invention is a primer which can be designed so as not only to improve the appearance of polyolefins such as polyethylene or rubbers by coloring them, but also to improve extensively their durability using ultraviolet-screening, prevent the oxidative deterioration of synthetic rubbers caused by oxygen or ozone, the contamination or the smelling of the synthetic rubbers, and also improve their abrasion resistance. Furthermore, different from the black coloration of the conventional polyethylene and rubber intended to maintain their weatherabilities, colorful appearances can be afforded to the polyethylene and rubber without impairing their weatherabilities, and the heat resistance, resistance to gasoline and resistance to chemicals of the primer itself can be improved.

The Polyethylene includes those such as low density (LDPE) and high density (HDPE) and super high density polyethylene. The rubber includes, for example, natural rubbers (NR), butadiene rubber (BR), styrene-butadiene rubber (SBR), acrylnitrile rubber (NBR), ethylene-propylene rubber (EPT), chloroprene rubber (CR), butyl rubber (IIR), urethane rubber and chlorosulfonated polyethylene rubber (CSM) (except silicone rubber).

DESCRIPTION OF THE PREFERRED EMBODIMENTS

The object of the present invention is to solve the problems in rubber which are contrary to each other and the difficulty of the pretreatment of polyethylene by providing a primer which has a good adhesion both to polyethylene, polypropylene and synthetic rubbers and to functional coatings in order to provide functions such as weatherability, ozone resistance or the like which relate to only the surface layer in a coating having such functions, thus to realize development of novel composite materials of polyethylene, polypropylene and synthetic rubber and a resin.

The first feature of the present invention comprises at least one component selected from a graft polymer (referred to hereinafter as "grafted EVA") of an unsaturated dicarboxylic acid and an ethylene-vinyl acetate copolymer (referred to hereinafter as "EVA"), a chlorinated polypropylene wherein a graft polymer of an unsaturated dicarboxylic acid and polypropylene is submitted to chlorine substitution (referred to hereinafter as a "grafted chlorinated polypropylene") or a chlorinated polypropylene in which polypropylene is merely submitted to chlorine substitution, and a graft polymer (referred to hereinafter as a "grafted EEA") of an unsaturated dicarboxylic acid and an ethylene-ethyl acrylate copolymer (referred to hereinafter as "EEA") or a product obtained from chlorine substitution of the graft polymer; and another component as a solvent.

The first embodiment in the first feature of the present invention consists in a primer composition which comprises

| | |
|---|---|
| a grafted EVA (referred to hereinafter merely as "parts"), | about 1–30 parts by weight |
| a pigment | about 0–30 parts, |
| a solvent and | about 40–99 parts, |
| an organic titanium compound the total being 100 parts. | about 0–5 parts, |

Thus, the primer according to the present invention comprises a graft polymer of an ethylene-vinyl acetate copolymer soluble in a solvent and having an excellent adhesion to polyethylene, polypropylene and rubber and an unsaturated dicarboxylic acid such as maleic anhydride or the like, and a solvent. A pigment or an organic titanium compound can be optionally added to the primer.

Even if such a pigment or an organic titanium compound are not incorporated, satisfactory adhesion to polyethylene can be obtained.

Using only the EVA, the hot melt adhesiveness to polyethylene or the adhesion of a topcoat can be obtained to a certain extent by controlling the concentration or molecular weight of the vinyl acetate. If the concentration of the polyethylene component is high in the EVA, the hot melt adhesiveness of the EVA to polyethylene is good while the adhesion of the topcoat is lowered. In contrast with this, if the concentration of the vinyl acetate component in the EVA is high, the adhesion of the topcoat is good, while the hot melt adhesiveness to the polyethylene is lowered.

In other words, the balance of the polyethylene and vinyl acetate in the EVA gives to the hot melt adhesiveness and the adhesion of the topcoat to the polyethylene effects, which are contrary to each other, and thus it cannot be expected to obtain results which correspond satisfactorily with the object by using only the EVA.

The graft polymer of an EVA and an unsaturated dicarboxylic acid such as maleic anhydride or the like according to the present invention represented by the general formula:

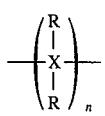

(I)

wherein R represents an EVA, and X represents an unsaturated dicarboxylic acid, is used, because the use of the graft polymer gives good adhesion of a topcoat even if an EVA having a comparatively low concentration of the vinyl acetate (and thus a high concentration of the polyethylene component) and good adhesiveness of a hot melt to the polyethylene is obtained as well because of a high concentration of the polyethylene component in the graft polymer.

If the graft polymer is constituted as described above, the polarity affording effect by the unsaturated dicarboxylic acid can be expected. Even if an EVA having a relatively low concentration of the vinyl acetate is used, good adhesion of a topcoat is obtained and good adhesiveness of a hot melt to polyethylene can be secured. As for rubber, good adhesiveness can be secured as well by adjusting the solubility parameter (SP value) of the graft polymer close to that of the rubber.

The first feature of the present invention is a primer composition in the liquid state of such a graft polymer of the EVA and the unsaturated dicarboxylic acid dissolved in a solvent.

The graft polymer used in the present invention has preferably a weight average molecular weight of $1-2\times10^5$ and a vinyl acetate content of 15–35%.

The amount of the graft polymer to be incorporated is in the range from 1 to 30 parts. The reason is that if the amount is less than 1 part it does not function as a primer, and if it exceeds 30 parts it will not exhibit a liquid state. When a trace amount of an organic titanium compound is used in a primer, the acetyl groups or the carbonyl groups in the graft polymer of the EVA and the unsaturated dicarboxylic acid are crosslinked by the organic titanium compound to give a film having a higher hardness. Moreover, the pigment and the surface of the polyethylene in the primer composition are also crosslinked only in a small proportion by the organic titanium compound to give an adhesiveness of the polyethylene stronger than that in the case when not using such a titanium compound. However, if the amount of the organic titanium compound exceeds 5 parts, the primer composition becomes very sensitive to humidity and thus adversely affected.

The pigment for the primer is used for the purpose of coloring and of increasing a little the film strength, and a pigment having a coloring ability and an extender pigment having no coloring ability are used in combination, which will cause no problem unless specific limitation is required for the kind of pigments, hue, or the like.

The solvent for the primer is preferably toluene or xylene. Benzene, tetrahydrofuran or triclene can also be used as a solvent, but they are not suitable for the primer because of their strong toxicity and irritation.

The second embodiment in the first feature of the present invention consists in a primer composition which comprises;

| | |
|---|---|
| a grafted EVA | about 2–30 parts, |
| a grafted chlorinated polypropylene or a chlorinated polypropylene in which polypropylene is merely submitted to chlorine substitution | about 0.5–25 parts, |
| a pigment | about 0–30 parts, and |
| a solvent the total being 100 parts. | about 40–97.5 parts, |

It aims at the improvement of the physical properties of the film and its adhesion to a topcoat.

The graft chlorinated polypropylene preferably has a weight average molecular weight of $6-10\times10^4$ and a chlorine content in the range from 20 to 30%.

This constitution is represented as a resin component of the general formula:

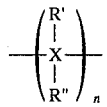

(II)

wherein R' represents a chlorinated polypropylene, and X represents an unsaturated dicarboxylic acid.

The grafted chlorinated polypropylene or the chlorinated polypropylene represented by the general formula:

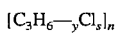

wherein y denotes 0.3–0.8 is incorporated so as to improve the film strength and the topcoat adhesion and to make possible bonding to polypropylene. The amount of the grafted EVA is in the range from 2 to 30 parts. The reason is that if the amount of the grafted EVA is less than 2 parts, bonding to polyethylene cannot be expected in the case of increasing the amount of the grafted chlorinated polypropylene or the merely chlorinated polypropylene to be incorporated, and if it exceeds 30 parts, the composition is not a liquid.

The amount of the grafted chlorinated polypropylene or the merely chlorinated polypropylene to be incorporated is in the range from about 0.5 to 25 parts. The reason is that when the amount is in the range less than 0.5 part the improvement of the film strength and the adhesion of the topcoat cannot be expected, and when it exceeds 25 parts the composition cannot be a liquid, owing to the increase of the loading of the grafted chlorinated polypropylene or the merely chlorinated polypropylene and the grafted EVA in order to prevent the loss of adhesion to polyethylene or rubber by increasing the amount of the grafted EVA to be incorporated.

The third embodiment in the first feature of the present invention consists in a primer composition which comprises a grafted EEA or a product obtained by the substitution of the

| graft polymer with chlorine | about 1–40 parts, |
| a pigment | about 0–30 parts, and |
| a solvent | about 40–99 parts, |
| the total being 100 parts. | |

The grafted EEA preferably has a weight average molecular weight of $5–15\times10^4$ and an ethyl acrylate content in the range of 15% or less.

The product obtained by the substitution of the graft polymer with chlorine has preferably a chlorine content from 10 to 25%.

This constitution is represented as a resin component of the general formula:

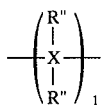

wherein R" represents an EEA or a chlorinated EEA, and X represents an unsaturated dicarboxylic acid. The reason why the chlorine substitution product of the graft polymer is used is that good adhesion of the topcoat is obtained by employing this graft polymer even in the case of an EEA having a relatively low concentration of ethyl acrylate (and a high concentration of a polyethylene component) and good adhesiveness of a hot melt to polyethylene is obtained owing to the high concentration of the polyethylene component in the graft polymer.

By constituting the grafted EEA as described above, the polarity-affording effect by the unsaturated dicarboxylic acid can be expected. Furthermore, good adhesiveness of the hot melt to polyethylene is obtained even in the case of an EEA having a relatively low concentration of ethyl acrylate and good adhesiveness of the hot melt to polyethylene can be maintained as well. Also, good adhesiveness to rubber can be maintained, as the solubility parameter (SP value) of the graft polymer or the chlorine substitution product of the graft polymer is close to that of the rubber.

The grafted EEA produces a film softer than that obtained from the grafted EVA and thus functions more efficiently as a primer for rubber.

In such a constitution, if the amount of the grafted EEA or the chlorine substitution product of the grafted EEA to be incorporated is less than 1 part, film formation is hard to obtain and thus the function as a primer is not fulfilled. On the other hand, if the amount exceeds 40 parts, the composition cannot be a liquid.

The fourth embodiment of the first feature of the present invention comprises;

| a grafted EEA or a product obtained by the substitution of the graft polymer with chlorine | about 2–40 parts, |
| a grafted chlorinated polypropylene or a chlorinated polypropylene in which polypropylene is merely submitted to chlorine substitution | about 0.5–15 parts, |
| a pigment | about 0–30 parts, and |
| a solvent | about 40–97.5 parts, |
| the total being 100 parts. | |

This constitution is characterized in that the grafted chlorinated polypropylene or the chlorinated polypropylene is incorporated to improve the film strength and the adhesion of a topcoat and to make possible bonding of polypropylene.

The amount of the grafted chlorinated polypropylene or the chlorinated polypropylene to be incorporated is in the range of 0.5–15 parts. The reason is that if the amount of the grafted EVA is less than 0.5 parts, the improvement of the film strength and the adhesion of the topcoat cannot be expected. If the amount exceeds 15 parts, adhesiveness to rubber is lost unless the amount of the grafted EEA or its chlorine substitution product is increased, and if the amount is increased, the amount of the resins in the composition becomes too much to yield the composition as a liquid.

If the blending rate of the grafted EEA or its chlorine substitution product is less than 2 parts, the amount of the grafted chlorinated polypropylene or the chlorinated polypropylene to be incorporated is increased and; the adhesiveness to rubber is lost. If the rate exceeds 40 parts, the composition is not a liquid.

The fifth embodiment in the first feature of the present invention consists in a primer composition which comprises

| a grafted EVA | about 1–30 parts, |
| a grafted EEA or a chlorine substitution product of the graft polymer | about 1–29.5 parts, |
| a grafted chlorinated polypropylene or a chlorinated polypropylene wherein polypropylene is merely substituted with chlorine | about 0.5–15 parts, |
| a pigment | about 0–30 parts, and |
| a solvent | about 40–97.5 parts, |
| the total being 100 parts. | |

This constitution is characterized in that the grafted chlorinated polypropylene or the chlorinated polypropylene is incorporated to improve the film strength and the adhesiveness to the topcoat and to make possible bonding to polypropylene, the grafted EEA or the chlorine substitution product of the graft polymer is incorporated to improve the follow-up ability to rubber, and the grafted EVA is incorporated to make possible better bonding to polyethylene.

The amount of the grafted EVA is in the range from 1 to 30 parts. The reason is that if it is less than 1 part, adhesiveness to polyethylene cannot be expected, and if it exceeds 30 parts, the composition is not in a liquid state.

If the amount of the grafted EEA or its chlorinated product to be incorporated is less than 1 part, the follow-up ability to rubber is not expected, and if it exceeds 29.5 parts, the amount of the grafted chlorinated polypropylene or the chlorinated polypropylene to be incorporated (the blending balance of the grafted EVA and the grafted EEA or its chlorinated product and grafted chlorinated polypropylene or the chlorinated polypropylene) cannot be maintained in an appropriate level.

The blending rate of the grafted chlorinated polypropylene or the chlorinated polypropylene is in the range from 0.5–15 parts. The reason is that if the rate is less than 0.5 part, the film strength and the adhesion to the topcoat will not be improved, and if exceeding 15 parts, the amount of the grafted EVA and the grafted EEA or its chlorinated product to be incorporated cannot be kept in an appropriate level and thus the adhesiveness to rubber is lost.

The second feature of the present invention consists in that the composition comprises at least one component selected from:
 a grafted EVA,
 a grafted chlorinated polypropylene or a chlorinated polypropylene wherein polypropylene is merely substituted with chlorine, and
 a grafted EEA or a chlorine substitution product of the graft polymer; and
 a chlorosulfonated polyethylene;
 a solvent; and
 a vulcanizing agent.

The chlorosulfonated polyethylene as a synthetic rubber exhibits, after vulcanization, excellent heat resistance, resistance to chemicals such as acids or alkalis, abrasion, weatherability and ozone resistance and will be degraded only a little by ultraviolet rays. Therefore, it was considered that a primer for topcoating of polyethylene and rubber could be obtained by affording to the vulcanized chlorosulfonated polyethylene the topcoating ability, which was the most serious property lacking in the chlorosulfonated polyethylene.

In order to improve the topcoating ability, intramolecular polarity is required in a level as much as possible for keeping the topcoating ability of a variety of paints in a good state, as rubber possesses no polarity and thus cannot adhere by means of polarity or chemical bond.

That is to say, in consideration of the solubility parameter (SP value) indicating the cohesive energy density (wetting between materials), polar groups are added within a range of approximate values of the SP value of polyethylene or rubber as a reference.

The approximation of the solubility parameter (SP value), that is to say, the equality or approximation of the degrees of non-polarity or the degrees of polarity is only necessary for good adhesion irrelative to the denaturated materials.

The solubility parameters (SP values) are as follows:

| polyethylene | 7.9 [(cal/cc)$^{1/2}$], |
|---|---|
| grafted EVA | 8.3–8.5, |
| grafted EEA | 8.5–8.7, |
| chlorosulfonated polyethylene | 8.6–8.9, |
| natural rubber (NR) | 7.9–8.4, |
| styrene-butadiene rubber (SBR) | 8.1–8.7, |
| chloroprene rubber (CR) | 8.8–9.2, |
| acrylonitrile rubber (NBR) | 8.9–9.4, |
| water | 23.4, and |
| silicone rubber | 7.3. |

The first embodiment in the second feature of the present invention consists in a primer composition which comprises:

| a grafted chlorinated polypropylene or a chlorinated polypropylene in which polypropylene is merely substituted with chlorine | about 2–30 parts, |
|---|---|
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

That is, a primer having the chlorosulfonated polyethylene as a main component in which the grafted chlorinated polypropylene is blended for improving the topcoating ability is examined. If the amount of the chlorosulfonated polyethylene is 0 parts, the composition is a conventional polyethylene or rubber primer and thus the amount of 3 parts or more is required. If the amount exceeds 30 parts, the topcoating ability decreases, and if exceeding 40 parts, the topcoating ability decreases extensively.

The amount of the grafted chlorinated polypropylene or the merely chlorinated polypropylene to be incorporated is in the range from 2 to 30 parts. If the amount is less than 2 parts, satisfactory topcoating ability cannot be expected. If the amount exceeds 30 parts, the heat resistance decreases extensively. Additives for vulcanization are those used for conventional rubber production.

The second embodiment in the second feature of the present invention consists in a primer composition which comprises:

| a grafted EVA | about 2–30 parts, |
|---|---|
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

The incorporation of the grafted EVA aims at affording good topcoating ability and improving the adhesiveness to polyethylene. The amount of the chlorosulfonated polyethylene to be incorporated is in the range from 3 to 40 parts. If the amount is less than 3 parts, heat resistance cannot be expected at all, and if exceeding 40 parts, the topcoating ability is extensively lowered.

The amount of the grafted EVA to be incorporated is in the range from 2 to 30 parts. If the amount is less than 2 parts, satisfactory topcoating ability cannot be expected, and if exceeding 30 parts, the heat resistance is extensively lowered.

The third embodiment in the second feature of the present invention consists in a primer composition which comprises:

| a grafted EEA or a chlorine substitution product of the graft polymer | about 2–30 parts, |
|---|---|
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

The incorporation of the grafted EEA or a chlorine substitution product of the graft polymer aims at obtaining good topcoating ability as well as keeping a good follow-up property to rubber.

The amount of the chlorosulfonated polyethylene to be incorporated is in the range from 3 to 40 parts. If the amount is less than 3 parts, heat resistance cannot be expected at all, and if exceeding 40 parts, the topcoating ability is extensively lowered. The amount of the grafted EEA to be incorporated is in the range from 2 to 30 parts. If the amount is less than 2 parts, satisfactory topcoating ability cannot be expected, and if exceeding 30 parts, the heat resistance is extensively lowered.

The fourth embodiment in the second feature of the present invention consists in a primer composition which comprises:

| | |
|---|---|
| a grafted EVA | about 1–20 parts, |
| a grafted chlorinated polypropylene or a chlorinated polypropylene in which polypropylene is merely substituted with chlorine | about 1–20 parts, |
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

The combination of the grafted EVA and the grafted chlorinated polypropylene or the chlorinated polypropylene aims at improving the adhesiveness to polyethylene and to polypropylene and the topcoating ability.

The amount of the chlorosulfonated polyethylene to be incorporated is in the range from 3 to 40 parts. If the amount is less than 3 parts, heat resistance cannot be expected at all, and if exceeding 40 parts, the topcoating ability cannot be expected.

The amount of the grafted EVA to be incorporated is in the range from 1 to 20 parts. If the amount is less than 1 part, improvement of the adhesiveness to polyethylene cannot be expected. If the amount exceeds 20 parts, the effect of the grafted chlorinated polypropylene or a merely chlorinated polypropylene is cancelled unless their blending rate is increased, so that it is necessary to increase their blending rate. Thus, the proper amount of the chloro sulfonated polyethylene to be incorporated will not be kept, and the heat resistance is lowered. The blending rate of the grafted chlorinated polypropylene or a merely chlorinated polypropylene is in the range from 1 to 20 parts. If the rate is less than 1 part, adhesiveness to polyethylene cannot be expected at all. If the rate exceeds 20 parts, the effect of the grafted EVA is cancelled unless the blending rate of it is increased, so that it is necessary to increase the blending rate of the greeted EVA. Thus, the proper amount of the chlorosulfonated polyethylene to be incorporated will not be kept, and the heat resistance is lowered.

The fifth embodiment in the second feature of the present invention consists in a primer composition which comprises:

| | |
|---|---|
| a grafted chlorinated polypropylene or a chlorinated polypropylene in which polypropylene is merely substituted with chlorine | about 1–20 parts, |
| a grafted EEA or a chlorine substitution product of the graft polymer | about 1–20 parts, |
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

The combination of the grafted EEA or its chlorinated product and the grafted chlorinated polypropylene or the chlorinated polypropylene aims at keeping good follow-up ability to rubber, securing the adhesiveness to polypropylene and improving the topcoating ability.

The amount of the chlorosulfonated polyethylene to be incorporated is in the range from 3 to 40 parts. If the amount is less than 3 parts, satisfactory heat resistance cannot be expected, and if exceeding 40 parts, the topcoating ability cannot be expected.

The amount of the grafted EEA to be incorporated is in the range from 1 to 20 parts. If the amount is less than 1 part, improvement of the topcoating ability and the follow-up ability to rubber cannot be expected at all. If the amount exceeds 20 parts, the effect of the grafted chlorinated polypropylene or a merely chlorinated polypropylene is cancelled unless their blending rate is increased, so that it is necessary to increase their blending rate. Thus, the proper amount of the chlorosulfonated polyethylene to be incorporated will not be secured, and the heat resistance is lowered.

The blending rate of the grafted chlorinated polypropylene or the merely chlorinated polypropylene is in the range from 1 to 20 parts. If the rate is less than 1 part, adhesiveness to polyethylene and improvement of the topcoating ability cannot be expected. If the rate exceeds 20 parts, the effect of the grafted EEA is cancelled unless the blending rate of it is increased, so that it is necessary to increase the blending rate of the grafted EEA. Thus, the proper amount of the chlorosulfonated polyethylene to be incorporated will not be kept, and the heat resistance is lowered.

The sixth embodiment in the second feature of the present invention consists in a primer composition which comprises:

| | |
|---|---|
| a grafted EVA | about 1–20 parts, |
| a grafted EEA or a chlorine substitution product of the graft polymer | about 1–20 parts, |
| a chlorosulfonated polyethylene | about 3–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–95 parts, |
| the total being 100 parts. | |

The combination of the grafted EVA and the grafted EEA or its chlorinated product aims at improving the adhesiveness to polyethylene, keeping good follow-up ability to rubber and securing the topcoating ability.

The amount of the chlorosulfonated polyethylene to be incorporated is in the range from 3 to 40 parts. If the amount is less than 3 parts, satisfactory heat resistance cannot be expected, and if exceeding 40 parts, topcoating ability cannot be expected.

The amount of the grafted EVA to be incorporated is in the range from 1 to 20 parts. If the amount is less then 1 part, adhesiveness to polyethylene cannot be expected at all. If the amount exceeds 20 parts, the effect of the grafted chlorinated polypropylene or a merely chlorinated polypropylene is cancelled unless their blending rate is increased, so that it is necessary to increase their blending rate. Thus, the proper amount of the chlorosulfonated polyethylene to be incorporated will not be secured, and the heat resistance is lowered.

The blending rate of the grafted EEA is in the range from 1 to 20 parts. If the rate is less than 1 part, improvement of the topcoating ability cannot be expected. If the rate exceeds 20 parts, the effect of the grafted EVA is cancelled unless the blending rate of it is increased, so that it is necessary to increase the blending rate of the grafted EVA. Thus, the proper amount of the chlorosulfonated polyethylene to be incorporated will not be kept, and the heat resistance is lowered.

The seventh embodiment in the second feature of the present invention consists in a primer composition which comprises:

| | |
|---|---|
| a grafted EVA | about 1–15 parts, |
| a grafted EEA or a chlorine substitution product of the graft polymer | about 1–15 parts, |
| a grafted chlorinated polypropylene or a chlorinated polypropylene in which polypropylene is merely substituted with chlorine | about 1–15 parts, |
| a chlorosulfonated polyethylene | about 4–40 parts, |
| a pigment | about 0–50 parts, |
| a vulcanizing agent | about 0–10 parts, |
| a vulcanization accelerator | about 0–5 parts, |
| an anti-aging agent | about 0–5 parts, and |
| a solvent | about 40–93 parts, |
| the total being 100 parts. | |

The combination of the grafted EVA, the grafted EEA or its chlorinated product and the grafted chlorinated polypropylene or the merely chlorinated polypropylene aims at improving adhesiveness to polyethylene improving the topcoating ability and improving the follow-up ability to rubber.

The amount of the chlorosulfonated polyethylene to be incorporated is in the range from 4 to 40 parts. If the amount is less than 4 parts, satisfactory heat resistance cannot be expected, and if exceeding 40 parts, a topcoating ability cannot be expected.

The amount of the grafted EVA to be incorporated is in the range from 1 to 15 parts. If the amount is less than 1 part, improvement of the adhesiveness to polyethylene cannot be expected. If the amount exceeds 15 parts, the effect of the two components of the grafted EEA or its chlorinated polymer and the grafted chlorinated polypropylene or the merely chlorinated polypropylene is cancelled unless their blending rate is increased, so that it is necessary to increase the blending rate of the two components. Thus, the proper amount of the chlorosulfonated polyethylene to be incorporated will not be secured, and the heat resistance is lowered.

The blending rate of the grafted EEA or the chlorinated product of the graft polymer is in the range from 1 to 15 parts. If the rate is less than 1 part, improvement of the topcoating ability and of the follow-up ability to rubber cannot be expected. If the rate exceeds 15 parts, the effect of the two components of the grafted EVA and the grafted chlorinated polypropylene or the merely chlorinated polypropylene is cancelled unless their blending rate is increased, so that it is necessary to increase the blending rate of the two components. Thus, the proper amount of the chlorosulfonated polyethylene to be incorporated will not be kept, and the heat resistance is lowered.

The blending rate of the grafted chlorinated polypropylene or the merely chlorinated polypropylene is in the range from 1 to 15 parts. If the rate is less than 1 part, adhesiveness to polypropylene cannot be expected. If the rate exceeds 15 parts, the effect of the two components of the grafted EVA polymer and the grafted EEA polymer is cancelled unless their blending rate is increased, so that it is necessary to increase the blending rate of the two components. Thus, the proper amount of the chlorosulfonated polyethylene to be incorporated will not be kept, and the heat resistance is lowered.

The aforementioned primers become liquid paints at room temperature by mixing and dispersing respective primer-constituting components, and thus can be coated by spraying, brushing or roller coating.

When the primer is coated on polyethylene, it is coated to ensure that the dry film has a thickness of about 15 μm. After the solvent has been evaporated, the film is irradiated with far infrared rays to form a strong bonding to polyethylene. Irradiation time of far infrared rays varies depending on the capacities of heaters or kinds of polyethylenes. In the case of HDPE, irradiation is carried out with a 4 KW far infrared heater for about 2.5–5 minutes per 0.1 m$^2$ of material to be irradiated to afford good adhesiveness.

Also, in the case of coating of rubber, the film may have the same thickness as in the case of polyethylene and is bonded strongly to rubber by the heat treatment by means of far infrared rays or a hot-air oven.

The third feature of the present invention consists in a pellet or powder primer composition in a solid state at room temperature wherein a solvent has been removed from the constituting primer according to the aforementioned first primer.

In other words, the third feature of the present invention consists in that the primer composition contains at least one component selected from the grafted EVA, the grafted chlorinated polypropylene or a chlorinated polypropylene in which polypropylene is merely substituted with chlorine, and the grafted EVA or a chlorine substitution product of the graft polymer.

The grafted EVA has preferably a weight average molecular weight of $1-2\times10^5$ and a vinyl acetate content of 15–35%.

The grafted chlorinated polypropylene has preferably a weight average molecular weight of $6-10\times10^4$ and a chlorine content of 20–30%. Also, the aforementioned chlorinated polypropylene in which polypropylene is substituted with chlorine has preferably a weight average molecular weight of $1-3\times10^5$ and a chlorine content of 20–40%.

The aforementioned grafted EVA has preferably a weight average molecular weight of $5-15\times10^4$ and an ethyl acrylate content of 15% or less. Also, the chlorine substitution product of the last graft polymer has preferably a chlorine content of 10–25%.

The first embodiment in the third feature of the present invention consists in that the primer composition comprises:

| | |
|---|---|
| a grafted EVA | about 50–100 parts and |
| a pigment | about 0–50 parts, |
| the total being 100 parts. | |

The primer composition cannot be prepared by a dry method, unless the grafted EVA is not incorporated in an amount of 50 parts or more.

The second embodiment in the third feature of the present invention consists in that the primer composition comprises:

| | |
|---|---|
| a grafted EVA | about 20–95 parts, |
| a grafted chlorinated polypropylene or a chlorinated polypropylene in which polypropylene is merely substituted with chlorine | about 5–60 parts, and |
| a pigment | about 0–50 parts, | the total being 100 parts. If the amount of the grafted EVA is less than 20 parts, the grafted chlorinated polypropylene or the chlorinated product of polypropylene must be incorporated in an amount of at least 30 parts or more and dechlorination reaction occurs too vigorously to prepare the primer composition under such a condition by a dry method.

If the amount of the grafted EVA exceeds 95 parts, the proper amount of the grafted chlorinated polypropylene or the merely chlorinated polypropylene to be incorporated cannot be kept.

If the amount of the grafted chlorinated polypropylene or the merely chlorinated polypropylene is less than 5 parts, improvement of the topcoating ability and adhesiveness to polyethylene cannot be expected.

If the amount exceeds 50 parts, the proper amount of the grafted EVA to be incorporated in the preparation cannot be secured, and dechlorination reaction occurs too vigorously to prepare the primer composition under such a condition by a dry method.

The third embodiment in the third feature of the present invention consists in that the primer composition comprises:

| | |
|---|---|
| a grafted EEA | about 50–100 parts and |
| a pigment | about 0–50 parts, |
| the total being 100 parts. | |

The primer composition cannot be prepared by a dry method, unless the grafted EEA is not incorporated in an amount of 50 parts or more.

The fourth embodiment in the third feature of the present invention consists in that the primer composition comprises:

| | |
|---|---|
| a grafted EEA | about 20–95 parts, |
| a grafted chlorinated polypropylene or a chlorinated polypropylene in which polypropylene is merely substituted with chlorine | about 5–60 parts, and |
| a pigment | about 0–50 parts, |
| the total being 100 parts. | |

If the amount of the grafted EVA is less than 20 parts, the grafted chlorinated polypropylene must be incorporated in an amount of at least 30 parts or more, and dechlorination reaction occurs too vigorously to prepare the primer composition under such a condition by a dry method.

If the amount of the grafted EVA exceeds 95 parts, the proper amount of the grafted chlorinated polypropylene or the merely chlorinated polypropylene to be incorporated cannot be secured.

If the amount of the grafted chlorinated polypropylene or the merely chlorinated polypropylene is less than 5 parts, improvement of the topcoating ability and adhesiveness to polyethylene cannot be expected.

If the amount of the grafted chlorinated polypropylene or the merely chlorinated polypropylene exceeds 60 parts, the proper amount of the grafted EEA to be incorporated in the preparation cannot be secured, and dechlorination reaction occurs too vigorously to prepare the primer composition under such a condition by a dry method.

The fifth embodiment in the third feature of the present invention consists in that the primer composition comprises:

| | |
|---|---|
| a grafted EVA | about 10–85 parts, |
| a grafted EEA | about 10–85 parts, |
| a grafted chlorinated polypropylene or a chlorinated polypropylene in which polypropylene is merely substituted with chlorine | about 5–60 parts, and |
| a pigment | about 0–50 parts, |
| the total being 200 parts. | |

The blending rate of the grafted EVA is in the range from 10 to 85 parts. If the amount of the grafted EVA is less than 10 parts, the effect of blending the grafted EVA cannot be expected, and if exceeding 85 parts, the blending rate of the grafted EEA and the grafted chlorinated polypropylene or the merely chlorinated product of polypropylene is lowered and the effect of these two components cannot be expected.

The amount of the grafted EEA to be incorporated is in the range from 10 to 85 parts. If the amount is less than 10 parts, the effect of blending the grafted EEA cannot be expected. If the amount exceeds 85 parts, the blending rate of the grafted EVA and the grafted chlorinated polypropylene or the merely chlorinated product of polypropylene is lowered and the effect of these two components cannot be expected.

The amount of the grafted chlorinated polypropylene or the merely chlorinated product of polypropylene is in the range from 5 to 60 parts. If the amount of the grafted chlorinated polypropylene or the merely chlorinated polypropylene is less than 5 parts, adhesiveness to polypropylene cannot be expected, and if exceeding 60 parts, the proper amount of the grafted EVA or the grafted EEA to be incorporated in the preparation cannot be secured, and dechlorination reaction occurs too vigorously to prepare the primer composition under such a condition by a dry method.

The effective method of mixing and dispersing the components is hot melt blending (dry method) with a double-screw extruder.

Pulverization can be easily performed by freeze-pulverizing a blended solid product obtained by the use of the double-screw extruder.

The fourth feature of the present invention consists in the pulverization of the chlorosulfonated polyethylene containing formulation of the aforementioned primer of the second feature of the present invention from which a solvent has been removed.

In other words, the fourth feature of the present invention consists in a powder type primer composition which comprises:

at least one component selected from a grafted EVA, a grafted chlorinated polypropylene or a chlorinated polypropylene in which polypropylene is merely substituted with chlorine and a grafted EEA or a chlorinated product of the graft polymer;

a chlorosulfonated polyethylene; and a vulcanizing agent.

The first embodiment in the fourth feature of the present invention consists in a powder-type primer composition which comprises:

| | |
|---|---|
| a grafted chlorinated polypropylene or a chlorinated polypropylene in which polypropylene is merely substituted with chlorine | about 5–90 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted chlorinated polypropylene or the merely chlorinated polypropylene to be incorporated is in the range from 5 to 90 parts. If the amount is less than 5 parts, satisfactory topcoating ability cannot be expected. If the amount exceeds 90 parts, the heat resistance is lost.

The second embodiment in the fourth feature of the present invention consists in a powder-type primer composition which comprises:

| | |
|---|---|
| a graftd EVA | about 5–90 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted EVA to be incorporated is in the range from 5 to 90 parts. If the amount is less than 5 parts, satisfactory topcoating ability cannot be expected. If the amount exceeds 90 parts, the heat resistance is lost.

The third embodiment in the fourth feature of the present invention consists in a powder-type primer composition which comprises:

| | |
|---|---|
| a grafted EEA or a chlorinated product of the graft polymer | about 5–90 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted EEA or the chlorinated product of the graft polymer to be incorporated is in the range from 5 to 90 parts. If the amount is less than 5 parts, satisfactory topcoating ability cannot be expected. If the amount exceeds 90 parts, the heat resistance is lost.

The fourth embodiment in the fourth feature of the present invention consists in a powder-type primer composition which comprises:

| | |
|---|---|
| a grafted chlorinated polypropylene or a chlorinated polypropylene in which polypropylene is merely substituted with chlorine | about 2.5–45 parts, |
| a grafted EVA | about 2.5–45 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted chlorinated polypropylene or the merely chlorinated polypropylene to be incorporated is in the range from 2.5 to 45 parts. If the amount is less than 2.5 parts, the adhesiveness to polypropylene is not improved at all. If the amount exceeds 45 parts, the effect of the grafted EVA is cancelled unless the amount of the grafted EVA to be incorporated is not increased. Thus, the amount must be increased, so that the amount of the chlorosulfonated polyethylene to be incorporated cannot be kept within a proper range, and the heat resistance is lowered.

The amount of the grafted EVA to be incorporated is in the range from 2.5 to 45 parts. If the amount is less than 2.5 parts, improvement of the adhesiveness to polyethylene cannot be expected. If the amount exceeds 45 parts, the effect of the grafted chlorinated polypropylene or the merely chlorinated polypropylene is cancelled unless the amount of them to be incorporated is increased. Thus, the amount must be increased, so that the amount of the chlorosulfonated polyethylene to be incorporated cannot be kept in a proper range, and the heat resistance is lowered.

The fifth embodiment in the fourth feature of the present invention consists in the powder-type primer composition which comprises:

| | |
|---|---|
| a grafted chlorinated polypropylene or a chlorinated polypropylene in which polypropylene is merely substituted with chlorine | about 2.5–45 parts, |
| a grafted EEA or a chlorine substitution product of the graft polymer | about 2.5–45 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted chlorinated polypropylene or the merely chlorinated polypropylene to be incorporated is in the range from 2.5 to 45 parts. If the amount is less than 2.5 parts, the adhesiveness to polypropylene is not improved at all. If the amount exceeds 45 parts, the effect of the grafted EVA is cancelled unless the amount of the grafted EEA to be incorporated is not increased. Thus, the amount must be increased, so that the amount of the chlorosulfonated polyethylene to be incorporated cannot be kept within a proper range, and the heat resistance is lowered.

The amount of the grafted EEA to be incorporated is in the range from 2.5 to 45 parts. If the amount is less than 2.5 parts, improvement of the adhesiveness to polyethylene cannot be expected. If the amount exceeds 45 parts, the effect of the grafted chlorinated polypropylene or the merely chlorinated polypropylene is cancelled unless the amount of them to be incorporated is increased. Thus, the amount must be increased, so that the amount of the chlorosulfonated polyethylene to be incorporated cannot be kept within a proper range, and the heat resistance is lowered.

The sixth embodiment in the fourth feature of the present invention consists in a powder-type primer composition which comprises:

| | |
|---|---|
| a grafted EVA | about 2.5–45 parts, |
| a grafted EEA or a chlorine substitution product of the graft polymer | about 2.5–45 parts, |
| a chlorosulfonated polyethylene | about 10–95 parts, |
| a pigment | about 0–50 parts, |
| a vulcanizing agent | about 0–10 parts, |
| a vulcanization accelerator | about 0–5 parts, and |

| | |
|---|---|
| an anti-aging agent | about 0–5 parts, |
| the total being 100 parts. | |

The amount of the chlorosulfonated polyethylene to be incorporated is in the range from 10 to 95 parts. If the amount is less than 10 parts, satisfactory heat resistance cannot be expected, and if exceeding 95 parts, the topcoating ability is completely lost.

The amount of the grafted EVA to be incorporated is in the range from 2.5 to 45 parts. If the amount is less than 2.5 parts, the adhesiveness to polyethylene is not improved at all. If the amount exceeds 45 parts, the effect of the grafted EEA or the chlorine substitution product of the graft polymer is cancelled unless the amount of the grafted EVA to be incorporated is not increased. Thus, the amount must be increased, so that the amount of the chlorosulfonated polyethylene to be incorporated cannot be kept within a proper range, and the heat resistance is lowered.

The amount of the grafted EEA to be incorporated is in the range from 2.5 to 45 parts. If the amount is less than 2.5 parts, satisfactory topcoating ability cannot be expected. If the amount exceeds 45 parts, the effect of the grafted EVA is cancelled unless the amount to be incorporated is increased. Thus, the amount must be increased, so that the amount of the chlorosulfonated polyethylene to be incorporated cannot be kept within a proper range, and the heat resistance is lowered.

The seventh embodiment in the fourth feature of the present invention consists in a powder-type primer composition which comprises:

| | |
|---|---|
| a grafted EVA | about 2.5–30 parts, |
| a grafted EEA or a chlorine substitution product of the graft polymer | about 2.5–30 parts, |
| a grafted chlorinated polypropylene or a chlorinated polypropylene in which polypropylene is merely substituted with chlorine | about 2.5–30 parts, |
| a chlorosulfonated polyethylene | about 10–92.5 parts, |
| a pigment | about 0–50 parts, |
| a vulcanizing agent | about 0–10 parts, |
| a vulcanization accelerator | about 0–5 parts, and |
| an anti-aging agent | about 0–5 parts, |
| the total being 100 parts. | |

The amount of the chlorosulfonated polyethylene to be incorporated is in the range from 10 to 92.5 parts. If the amount is less than 10 parts, satisfactory heat resistance cannot be expected, and if exceeding 92.5 parts, the topcoating ability is completely lost.

The amount of the grafted EVA to be incorporated is in the range from 2.5 to 30 parts. If the amount is less than 2.5 parts, the adhesiveness to polyethylene is not improved at all. If the amount exceeds 30 parts, the effect of the two components of the grafted EEA or the chlorinated product of the graft polymer and the grafted chlorinated polypropylene or the merely chlorinated polypropylene is cancelled unless the amount of the two components to be incorporated is not increased. Thus, the amount must be increased, so that the amount of the chlorosulfonated polyethylene to be incorporated cannot be kept within a proper range, and the heat resistance is lowered.

The amount of the EEA or the chlorinated product of the graft polymer to be incorporated is in the range from 2.5 to 30 parts. If the amount is less than 2.5 parts, improvement of the topcoating ability and of the follow-up ability to rubber cannot be expected. If the amount exceeds 30 parts, the effect of the two components of the grafted EVA and the grafted chlorinated polypropylene or the merely chlorinated polypropylene is cancelled unless the amount of the two components to be incorporated is not increased. Thus, the amount must be increased, so that the amount of the chlorosulfonated polyethylene to be incorporated cannot be kept within a proper range, and the heat resistance is lowered.

The amount of the grafted chlorinated polypropylene or the merely chlorinated polypropylene to be incorporated is in the range from 2.5 to 30 parts. If the amount is less than 2.5 parts, improvement of the adhesiveness to polypropylene cannot be expected. If the amount exceeds 30 parts, the effect of the two components of the grafted EVA and the grafted EEA or the chlorinated product of the graft polymer is cancelled unless the amount of them to be incorporated is increased. Thus, the amount must be increased, so that the amount of the chlorosulfonated polyethylene to be incorporated cannot be kept within a proper range, and the heat resistance is lowered.

When the primer composition is prepared by a process including a heating step, the vulcanization of the chlorosulfonated polyethylene takes place. Thus, pulverization by means of the dry method (using a double-screw extruder or the like) is impossible, so that the powder-type primer composition is prepared by a wet method.

The wet method is a spray drying method, and the powder-type primer passing through a screen of 80 mesh size (particular size in the range of 44–177 μm) is typically prepared from the solvent-type primer of the first embodiment in the second feature of the present invention with a spray drier.

For example, the powder-type primer of the first embodiment in the fourth feature of the present invention has the following particle size distribution:

| mesh (μm) | determination (%) |
|---|---|
| 80 (177) | 2.2 |
| 100 (149) | 7.5 |
| 145 (105) | 16.1 |
| 200 (74) | 18.1 |
| 250 (63) | 24.2 |
| 350 (44) | 36.9 |

The powder-type primer is coated on polyethylene, rubber or the like by a fluidized dipping method. The primer must not necessarily be melted and leveled during its coating by fluidized dipping as it is subjected to thermal treatment by the irradiation of far infrared rays after the coating step, and thus the material to be coated must only be heated preliminarily at about 100° C.

The primer coated by the fluidized dipping method forms a particulate layer on the surface of the material to be coated such as polyethylene (e.g. HDPE), rubber or the like, which layer is melted and leveled by irradiating with far infrared rays and forms a strong bond to the material to be coated. Treatment time of the primer by far infrared rays varies depending on primers, film thicknesses and materials to be coated. When the primer of the third feature of the present invention and a polyethylene (HDPE) as a material to be coated are used and the film has a thickness of 50 μm, thermal treatment time is 3 minutes with a 4 KW heater per 0.1 m² of the material to be coated. Under the same conditions of the primer, film thickness and the heater except that the material to be coated is rubber, the thermal treatment time is about 40 seconds.

When the primer of a powder-type of the fourth feature of the present invention is used, thermal treatment is performed for 5 minutes with the same heater as described above irrelative to the thickness of the film or the materials to be coated (because the thermal treatment time is prolonged by vulcanization). The primer thus heat-treated bonds strongly to the material to be coated and exhibits a good topcoating ability.

The fifth feature of the present invention consists in an efficient heating method. In other words, although heating is not required for some materials to be coated, better adhesiveness to a non-polar material is generally obtained by heating (or in some cases heating under pressure).

Intimate mixing of a material to be coated (polyethylene, polypropylene or rubber) and a primer (a grafted EVA, EEA or the like) is enhanced in the interface of these molecules by heating, and better adhesiveness can be obtained.

Since the main component of the present invention is a denature polyolefin primer, the absorption wave length of infrared rays for its heating is in the range of 5–50 μm and the primer must only have a function of forming a chemical bond to only the surface of a material to be coated such as polyethylene or rubber. Therefore, the heater used in the present invention is a far infrared heater, and the wave length of the infrared rays irradiated is in the range of 3–50 μm. It may be said in this connection that the wave lengths of infrared rays irradiated by other heaters are in the range of 0.7 to about 2 μm for a nichrome wire, 0.7 to about 3 μm for an infrared lamp and 0.7 to about 7 μm for a quartz-sheathed element heater.

According to the present invention, the far infrared heater efficiently generates far infrared rays in a wide range of 3–50 μm and bonding reaction on the superficial layer finishes in a short time, so that a product bonded to polyethylene or rubber is obtained with little decomposition by heating.

As described above, the material of the present invention has a SP value close to those of polyethylene, polypropylene and synthetic rubbers, so that they are easily blended and wetted with each other. Also, a graft polymer of an unsaturated dicarboxylic acid and EVA or EEA has a SP value close to those of polyethylene and rubber and exhibits a very good topcoating ability by intramolecular polarization by a vinyl acetate group, and an ethyl acrylate group, in particular a carbonyl group in the case of maleinization.

Furthermore, the grafted EVA and EEA (in particular, EEA) have good flexibility. The chlorosulfonated polyethylene is a synthetic rubber which is classified to a chloroprene rubber.

A Cl group bonded to a polymer inhibits crystallization caused by the arrangement of the polymer and affords the polymer flexibility.

Also, a group $SO_2Cl$ becomes a crosslinking point which affords the polymer excellent properties such as heat resistance, solvent resistance (e.g. resistance to gasoline), resistance to chemicals and the like.

Thus, polyethylene, polypropylene or rubber can be subjected to coating or thermocontact bonding to coat or print a paint or an ink. For instance, if a polyethylene pipe used outdoors such as a petroleum pipe line is treated with the present invention to coat a fluorine resin paint, the appearance of the pipe is improved by coloration and the durability of the pipe is extensively improved by the ultraviolet screening effect of the paint as well. If the primer of the present invention is coated on the internal surface of a mold on the injection molding of a polyethylene article, a polyethylene injection-molded article which can be optionally coated or printed after mold release and has an excellent weatherability can be obtained. Also, a solid primer composition prepared by heat fusion kneading without a solvent can be molded together with polyethylene by a two lager extrusion method to form a pipe, a plate or other articles which can be coated or printed. Furthermore, the present invention has an excellent follow-up ability to rubber. Therefore, the present invention not only can work for the prevention of oxidative deterioration of synthetic rubbers by oxygen or ozone, the prevention of contamination by dust or the like, the prevention of smelling of synthetic rubbers and the improvement of abrasion, but also can make the appearance of polyethylene, polypropylene and rubber colorful without deterioration of them as compared with the black coloration of polyethylene and rubber as a measure of conventional weatherability. Also, the present invention improves extensively heat resistance, resistance to gasoline and resistance to chemicals of the primer itself.

As the result, the primer composition of the present invention and the polyethylene which is subjected to the far infrared rays treatment as a heating means after coating with the primer can keep their forms very easily. Also, for synthetic rubbers, products coated with the primer can be obtained with little deterioration of the properties, and the thermal treatment can be completed easily and effectively in a very short time. Therefore, it is apparent that the present invention plays a great effect in the enlargement of the application or demand of polyethylene, polypropylene and rubber articles.

EXAMPLE

Table 1 below shows the properties of the primers according to the present invention.

TABLE-1

| Embodiment No. | Example | | | | | | |
|---|---|---|---|---|---|---|---|
| | 1 | 2 | 3 | 4 | 5 | 6 | 7 |
| | First feature | | | | | | |
| Component incorporated | | | | | | | |
| Maleinized EVA*[1] | 7 | 7 | — | — | 5 | | |
| Maleinized EEA*[2] | — | — | 7 | 7 | 5 | | |
| Chlorinated polypropylene*[3] | — | 7 | — | 7 | 5 | | |
| Chlorosulfonated polyethylene*[4] | — | — | — | — | — | | |
| Titanium oxide (rutile type) | 5 | 5 | 5 | 5 | 5 | | |
| Vulcanizing agent*[5] | — | — | — | — | — | | |
| Vulcanization accelerator*[6] | — | — | — | — | — | | |
| Organic titanium compound*[7] | 1 | — | — | — | — | | |
| Anti-aging agent*[8] | — | — | — | — | — | | |
| Toluene | 80 | 80 | 88 | 81 | 80 | | |
| Total Amount | 100 | 100 | 100 | 100 | 100 | | |

TABLE-1-continued

| Film property of primer composition*9 | | | | | |
|---|---|---|---|---|---|
| Breaking strength (kg/cm²) | 45 | 65 | 35 | 40 | 55 |
| Elongation (%) | 80 | 240 | 200 | 150 | 205 |
| Adhesion of primer to matrix*10 | | | | | |
| LDPE | 100/100 | 100/100 | 80/100 | 80/100 | 100/100 |
| HDPE | 100/100 | 100/100 | 80/100 | 80/100 | 100/100 |
| PP | 70/100 | 100/100 | 80/100 | 100/100 | 200/100 |
| NR | 100/100 | 100/100 | 95/100 | 90/100 | 100/200 |
| SBR | 100/100 | 100/100 | 95/100 | 90/100 | 100/100 |
| NBR | 100/100 | 100/100 | 100/100 | 100/100 | 100/100 |
| CR | 100/100 | 100/200 | 100/100 | 100/200 | 100/100 |
| EPT | 100/200 | 100/100 | 95/100 | 90/100 | 100/100 |
| Topcoat adhesion*11 | | | | | |
| Urethane type paint | 95/100 | 100/100 | 95/100 | 100/100 | 100/100 |
| Fluorine type paint | 100/100 | 100/100 | 200/100 | 100/100 | 100/100 |
| Water resistance*12 | | | | | |
| HDPE | | | | | |
| SBR | | | | | |
| Heat resistance*13 | | | | | |
| Weatherability*14 | | | | | |
| HDPE | | | | | |
| SBR | | | | | |

| | Second feature | | | | | | |
|---|---|---|---|---|---|---|---|
| Component incorporated | | | | | | | |
| Maleinized EVA*1 | — | 5 | — | 2 | — | 3 | 2 |
| Maleinized EEA*2 | — | — | 5 | — | 2 | 2 | 2 |
| Chlorinated polypropylene*3 | 5 | — | — | 3 | 3 | — | 3 |
| Chlorosulfonated polyethylene*4 | 15 | 15 | 15 | 15 | 15 | 15 | 15 |
| Titanium oxide (rutile type) | 25.5 | 25.5 | 25.5 | 25.5 | 25.5 | 25.5 | 25.5 |
| Vulcanizing agent*5 | 5 | 5 | 5 | 5 | 5 | 5 | 5 |
| Vulcanization accelerator*6 | 0.5 | 0.5 | 0.5 | 0.5 | 0.5 | 0.5 | 0.5 |
| Organic titanium compound*7 | — | — | — | — | — | — | — |
| Anti-aging agent*8 | 0.5 | 0.5 | 0.5 | 0.5 | 0.5 | 0.5 | 0.5 |
| Toluene | 49 | 49 | 49 | 49 | 49 | 49 | 49 |
| Total Amount | 100 | 100 | 100 | 100 | 100 | 100 | 200 |
| Film property of primer composition*9 | | | | | | | |
| Breaking strength (kg/cm²) | 110 | 75 | 50 | 90 | 65 | 60 | 70 |
| Elongation (%) | 280 | 120 | 355 | 210 | 300 | 220 | 250 |
| Adhesion of primer to matrix*10 | | | | | | | |
| LDPE | 75/100 | 100/100 | 75/100 | 90/100 | 75/100 | 90/100 | 85/100 |
| HDPE | 75/100 | 100/100 | 75/100 | 90/100 | 75/100 | 90/100 | 85/100 |
| PP | 100/100 | 90/100 | 80/100 | 95/100 | 90/100 | 85/100 | 90/100 |
| NR | 100/100 | 100/100 | 100/100 | 100/100 | 100/100 | 100/100 | 100/100 |
| SBR | 100/100 | 100/100 | 100/100 | 100/100 | 100/100 | 100/100 | 100/100 |
| NBR | 100/100 | 100/100 | 100/100 | 100/100 | 100/100 | 100/100 | 100/100 |
| CR | 100/100 | 100/100 | 100/100 | 100/100 | 100/100 | 100/100 | 100/100 |
| EPT | 100/100 | 100/100 | 100/100 | 100/100 | 100/100 | 100/100 | 100/100 |
| Topcoat adhesion*11 | | | | | | | |
| Urethane type paint | 100/100 | 95/100 | 95/100 | 100/100 | 100/100 | 95/100 | 100/100 |
| Fluorine type paint | 100/100 | 100/100 | 100/100 | 100/200 | 100/100 | 100/100 | 100/100 |
| Water resistance*12 | | | | | | | |
| HDPE | | | | | | | |
| SBR | | | | | | | |
| Heat resistance*13 | — | Δ | — | Δ | — | | |
| Weatherability*14 | | | | | | | |
| HDPE | | | | | | | |
| SBR | | | | | | | |

| | Third feature | | | | |
|---|---|---|---|---|---|
| Component incorporated | | | | | |
| Maleinized EVA*1 | 60 | 40 | — | — | 20 |
| Maleinized EEA*2 | — | — | 60 | 40 | 20 |
| Chlorinated polypropylene*3 | — | 20 | — | 20 | 20 |
| Chlorosulfonated polyethylene*4 | — | — | — | — | — |
| Titanium oxide (rutile type) | 40 | 40 | 40 | 40 | 40 |
| Vulcanizing agent*5 | — | — | — | — | — |

TABLE-1-continued

| | | | | | |
|---|---|---|---|---|---|
| Vulcanization accelerator*6 | — | — | — | — | — |
| Organic titanium compound*7 | — | — | — | — | — |
| Anti-aging agent*8 | — | — | — | — | — |
| Toluene | — | — | — | — | — |
| Total Amount | 100 | 100 | 100 | 100 | 100 |
| **Film property of primer composition*9** | | | | | |
| Breaking strength (kg/cm$^2$) | 45 | 85 | 35 | 55 | 70 |
| Elongation (%) | 80 | 250 | 200 | 190 | 210 |
| **Adhesion of primer to matrix*10** | | | | | |
| LDPE | 100/100 | 100/100 | 80/100 | 80/100 | 100/100 |
| HDPE | 100/100 | 100/100 | 80/100 | 80/100 | 100/100 |
| PP | 70/100 | 100/100 | 80/100 | 100/100 | 100/100 |
| NR | 100/100 | 100/100 | 95/100 | 90/100 | 100/100 |
| SBR | 100/100 | 100/100 | 95/100 | 90/100 | 100/100 |
| NBR | 100/100 | 100/100 | 100/100 | 100/100 | 100/100 |
| CR | 100/100 | 100/100 | 100/100 | 100/100 | 100/100 |
| EPT | 100/100 | 100/100 | 95/100 | 90/100 | 100/100 |
| **Topcoat adhesion*11** | | | | | |
| Urethane type paint | 95/100 | 100/100 | 95/100 | 100/100 | 100/100 |
| Fluorine type paint | 100/100 | 100/100 | 100/100 | 100/100 | 100/100 |
| **Water resistance*12** | | | | | |
| HDPE | | | | | |
| SBR | | | | | |
| **Heat resistance*13** | | | | | |
| **Weatherability*14** | | | | | |
| HDPE | | | | | |
| SBR | | | | | |

| | Fourth feature | | | | | | |
|---|---|---|---|---|---|---|---|
| Component incorporated | | | | | | | |
| Maleinized EVA*1 | — | 10 | — | 4 | — | 6 | 4 |
| Maleinized EEA*2 | — | — | 10 | — | 4 | 4 | 4 |
| Chlorinated polypropylene*3 | 10 | — | — | 6 | 6 | — | 6 |
| Chlorosulfonated polyethylene*4 | 30 | 30 | 30 | 30 | 30 | 30 | 30 |
| Titanium oxide (rutile type) | 48 | 48 | 48 | 48 | 48 | 48 | 44 |
| Vulcanizing agent*5 | 10 | 10 | 10 | 10 | 10 | 10 | 10 |
| Vulcanization accelerator*6 | 1 | 1 | 1 | 1 | 1 | 1 | 1 |
| Organic titanium compound*7 | — | — | — | — | — | — | — |
| Anti-aging agent*8 | 1 | 1 | 1 | 1 | 1 | 1 | 1 |
| Toluene | — | — | — | — | — | — | — |
| Total Amount | 100 | 100 | 100 | 100 | 100 | 100 | 100 |
| **Film property of primer composition*9** | | | | | | | |
| Breaking strength (kg/cm$^2$) | 110 | 75 | 50 | 90 | 65 | 60 | 70 |
| Elongation (%) | 280 | 120 | 355 | 210 | 300 | 220 | 250 |
| **Heat resistance*13** | | | | | | | |
| **Weatherability*14** | | | | | | | |
| HDPE | | | | | | | |
| SBR | | | | | | | |

Note:
*1Graft polymer of an ethylene-vinyl acetate copolymer and maleic anhydride having a weight average molecular weight of ca. $1.7 \times 10^5$ and a vinyl acetate content of 25%.
*2Chlorinated graft polymer of an ethylene-ethyl acrylate copolymer and maleic anhydride having a weight average molecular weight of ca. $10^5$, an ethyl acrylate content of ca. 10% and a chlorine content of ca. 20%.
*3Chlorinated graft polymer of polypropylene and maleic anhydride having a weight average molecular weight of ca. $8 \times 10^4$ and a chlorine content of ca. 25%.
*4Chlorosulfonated polyethylene having a weight average molecular weight of ca. $2 \times 10^5$, a chlorine content of ca. 30% and a sulfur content of ca. 1.5%, and represented by the general structural formula
$[(C_2H_{4-x}Cl_x)_n CH_2CHSO_2Cl]_m \times 0.3$.
*5Lead tribasic maleate.
*6Tetraethylthiuram disulfide.
*7Di-iso-propoxy-bis(acetylacetonato)titanium.
*84,4'-thio-bis(6-tert-butyl-3-methylphenol).
*9According to the tensile test of the "vulcanized rubber, physical tests" (1) of JIS-K-6301, using a test piece of dumbbell #1.
*10According to the grid test of the "general test methods of paints" 6.15 of JIS-K-5400; each primer composition having a film thickness of 15 μm (except 50 μm for a powder type).
LDPE: low density polyethylene; HDPE: high density polyethylene; PP: polypropylene;
NR: natural rubber; SBR: styrene-butadiene rubber; NBR: acrylonitrile rubber;
CR: chloroprene rubber; EPT: ethylene-propylene rubber.
*11Adhesion of urethane type and fluorine type paints to respective primer compositions of exmaples are TABLE-1-continued measured according to the grid test of the "general test methods of paints" 6.15 of JIS-K-5400; the urethane
type paint used is "UNIMARIN" (trade name), and the fluorine type paint used is "FLOWREX" respectively.
[*12] According to the water resistance test of the "general test methods of paints" 7.2 of JIS-K-5400; when
the substrate (to be coated) is HDPE, the facing material is "FLOWREX" (trade name), and when the
substrate is SBR, the facing material is "UNIMARIN" (trade name).
Respective primer compositions of examples have a film thickness of 15 μm (except 50 μm for a powder
type), and respective facing materials have a film thickness of 50 μm.
Evaluation measure:
: No problem for 12 months;  : No problem for 6 months; Δ: No problem for 1 month;
X: Blistering after 1 month or more.
[*13] According to the measuring method of the softening temperature of the "test method of adhesives for
automobile" 13 of JIS-K-6829; test pieces is the samples subjected to shear test, each of which is SBR
coated with a primer composition of the example, subjected to thermal treatment and laminated with a cyanoacrylate
type adhesive.
Evaluation measure:
: 71° C. or more;  : 51–71° C.; Δ: 40–50° C.; X: 39° C. or less.
[*14] Accelerated weatherability by a sunshine type weathermeter; when the substrate (to be coated) is HDPE, the
facing material is "FLOWREX" (trade name), and when the substrate is SBR, the facing material is
"UNIMARIN" (trade name). Respective primer compositions of examples have a film thickness of 15 μm
(except 50 μm for a powder type), and respective facing materials have a film thickness of 50 μm.
Evaluation measure:
: No problem for 4000 hours;  : No problem for 1000 hours;
Δ: No problem for 600 hours; X: cracking, wrinkling, extensive decrease of gloss or discoloration.
(When the substrate is SBR, discoloration of the color difference (ΔE) in the range of 0.5–1.0 caused by a
migratory substance from the rubber is judged no problem).

What is claimed is:

1. A process for pre-treating synthetic materials selected from the group consisting of polyethylene, polypropylene and rubbers, comprising the steps of:
   first applying to said synthetic material a primer composition comprising:
   1) a graft polymer of reactants consisting of an unsaturated dicarboxylic acid and an ethylene-vinyl acetate copolymer;
   2) a chlorinated polypropylene chosen from the list consisting of
      i) a graft polymer of an unsaturated dicarboxylic acid and a polypropylene wherein the graft polymer is substituted with chlorine and
      ii) a chlorinated polypropylene wherein the polypropylene is substituted with chlorine; and
   3) a solvent; and
   then heating said applied primer composition with a far infrared ray heater generating infrared rays having a wavelength ranging from about 3 to about 50 μm to the extent necessary to either chemically bond or fusion weld said primer composition to said synthetic material.

2. A process according to claim 1, wherein said graft polymer is present in an amount of about 1–30 parts by weight, said solvent is present in an amount of about 40–99 parts by weight and further comprising a pigment present in an amount of about 0–30 parts by weight and an organic titanium compound present in an amount of about 0–5 parts by weight, based on a total of 100 parts by weight.

3. A process according to claim 1, wherein said graft polymer is present in an amount of about 2–30 parts by weight, and said chlorinated polypropylene is present in an amount of about 0.5–25 parts by weight, said solvent is present in an amount of about 40–99 parts by weight, and said primer composition further comprises a pigment present in an amount of about 0–30 parts by weight, and an organic titanium compound present in an amount of about 0–5 parts by weight, based on a total of 100 parts by weight.

4. A process according to claim 1, wherein said graft polymer of an unsaturated dicarboxylic acid and an ethylene-vinyl acetate copolymer is present in an amount of about 1–30 parts by weight, said chlorinated polypropylene is present in an amount of about 0.5–15 parts by weight, said solvent is present in an amount of about 40–97.5 parts by weight, further comprising a graft polymer of an unsaturated dicarboxylic acid and an ethylene-ethyl acrylate copolymer or a chlorinated product of the graft polymer present in an amount of about 1–29.5 parts by weight and a pigment present in an amount of about 0–30 parts by weight, based on a total of 100 parts by weight.

5. A process according to claim 1, wherein said graft polymer of an unsaturated dicarboxylic acid and an ethylene-vinyl acetate copolymer has a weight average molecular weight of $1–2\times10^5$ and a vinyl acetate content of 15–35%, said chlorinated polypropylene comprising a graft polymer of an unsaturated dicarboxylic acid and polypropylene substituted with chlorine has a weight average molecular weight of $6\times10^4–10^5$ and a chlorine content of 20–30%, and said chlorinated polypropylene wherein polypropylene is substituted with chlorine has a weight average molecular weight of $1–3\times10^5$ and a chlorine content of 20–40%.

6. A process for pre-treating synthetic materials selected from the group consisting of polyethylene, polypropylene and rubbers, comprising first applying to said synthetic material a solid state primer composition selected from the group consisting of pellets and powder at room temperature comprising:
   1) a graft polymer of reactants consisting of an unsaturated dicarboxylic acid and an ethylene-vinyl acetate copolymer; and
   2) a chlorinated polypropylene chosen from the list consisting of
      i) a graft polymer of an unsaturated dicarboxylic acid and a polypropylene wherein the graft polymer is substituted with chlorine and
      ii) a chlorinated polypropylene wherein the polypropylene is substituted with chlorine; and
   then heating said applied primer composition with a far infrared ray heater generating infrared rays having a wavelength ranging from about 3 to about 50 μm to the extent necessary to either chemically bond or fusion weld said primer composition to said synthetic material.

7. A process according to claim 6, wherein said graft polymer is present in an amount of about 50–100 parts by weight, and further comprising a pigment present in an amount of about 0–50 parts by weight, based on a total of 100 parts by weight.

8. A process according to claim 6, wherein said graft polymer is present in an amount of about 20–95 parts by weight, and said chlorinated polypropylene is present in an amount of about 5–60 parts by weight, and said primer composition further comprises a pigment present in an amount of about 0–50 parts by weight, based on a total of 100 parts by weight.

9. A process according to claim 6, wherein said graft polymer of an unsaturated dicarboxylic acid and an ethylene-vinyl acetate copolymer is present in an amount of about 10–85 parts by weight, said chlorinated polypropylene is present in an amount of about 5–60 parts by weight, and further comprising a graft polymer of an unsaturated dicarboxylic acid and an ethylene-ethyl acrylate copolymer or a chlorinated product of the graft polymer present in an amount of about 1–85 parts by weight, and a pigment present in an amount of about 0–50 parts by weight, based on a total of 100 parts by weight.

10. A process according to claim 6, wherein said graft polymer of an unsaturated dicarboxylic acid and an ethylene-vinyl acetate copolymer has a weight average molecular weight of $1-2\times10^5$ and a vinyl acetate content of 15–35%, said chlorinated polypropylene comprising a graft polymer of an unsaturated dicarboxylic acid and polypropylene substituted with chlorine has a weight average molecular weight of $6\times10^4-10^5$ and a chlorine content of 20–30%, and said chlorinated polypropylene comprising polypropylene substituted with chlorine has a weight average molecular weight of $1-3\times10^5$ and a chlorine content of 20–40%.

11. A process for pre-treating synthetic materials selected from the group consisting of polyethylene, polypropylene and rubbers, comprising first applying to said synthetic material a primer composition comprising:

a denatured polyolefin and a solvent, and then heating said applied primer composition with a far infrared ray heater; for, generating fusion welding adhesion by way of infrared rays having a wavelength ranging from about 3 to about 50 µm and chemically bonding said primer composition to said synthetic material.

12. A process as in claim 11, wherein said denaturated polyolefin comprises a mixture of a graft polymer of reactants consisting of an unsaturated dicarboxylic acid and an ethylene-vinyl acetate copolymer, and a chlorinated polypropylene.

13. A process as in claim 12, wherein said chlorinated polypropylene is selected from the group consisting of a graft polymer of an unsaturated dicarboxylic acid and polypropylene substituted with chlorine, and polypropylene substituted with chlorine.

14. A process as in claim 12, wherein said graft polymer is present in an amount of about 2 to 30 parts by weight, said chlorinated polypropylene is present in an amount of about 0.5 to 25 parts by weight, and said solvent is present in an amount of about 40 to 97.5 parts by weight, said primer composition further comprising a pigment present in an amount of about 0 to 30 parts by weight, based on a total of 100 parts by weight.

15. A process for pre-treating synthetic materials selected from the group consisting of polyethylene, polypropylene and rubbers, comprising first applying to said synthetic material a solid state primer composition selected from the group consisting of pellets and powder at room temperature comprising:

a denatured polyolefin, and then heating said applied primer composition with a far infrared ray heater; for, generating fusion welding adhesion by way of infrared rays having a wavelength ranging from about 3 to 50 µm and chemically bonding said primer composition to said synthetic material.

16. A process as in claim 15, wherein said denaturated polyolefin comprises a mixture of a graft polymer of reactants consisting of an unsaturated dicarboxylic acid and an ethylene-vinyl acetate copolymer, and a chlorinated polypropylene.

17. A process as in claim 16, wherein said chlorinated polypropylene is selected from the group consisting of a graft polymer of an unsaturated dicarboxylic acid and polypropylene substituted with chlorine, and polypropylene substituted with chlorine.

18. A process as in claim 16, wherein said graft polymer is present in an amount of about 20 to 95 parts by weight, said chlorinated polypropylene is present in an amount of about 5 to 60 parts by weight, and said primer composition further comprises a pigment present in an amount of about 0 to 50 parts by weight, based on a total of 100 parts by weight.

19. A process for pre-treating synthetic materials selected from the group consisting of polyethylene, polypropylene and rubbers, comprising first applying to said synthetic material a primer composition comprising:

1) a graft polymer of reactants consisting of an unsatured dicarboxylic acid and an ethylene-ethyl acrylate copolymer or a chlorinated product of the graft polymer;

2) a chlorinated polypropylene chosen from the list consisting of
  i) a graft polymer of an unsaturated dicarboxylic acid and a polypropylene wherein the graft polymer is substituted with chlorine and
  ii) a chlorinated polypropylene wherein the polypropylene is substituted with chlorine; and 3) a solvent; and then heating said applied primer composition with a far infrared ray heater generating infrared rays having a wavelength ranging from about 3 to about 50 µm to the extent necessary to either chemically bond or fusion weld said primer composition to said synthetic material.

20. A process according to claim 19, wherein said graft polymer has a weight average molecular weight of $5-15\times10^4$ and an ethyl acrylate content of 15 or less.

21. A process according to claim 19, wherein said chlorinated product of the graft polymer of an unsaturated dicarboxylic acid and an ethylene-ethyl acrylate copolymer has a chlorine content of 10–25%.

22. A process according to claim 19, wherein said graft polymer or the chlorinated product of the graft polymer is present in an amount of about 1–40 parts by weight, said solvent is present in an amount of about 40–99 parts by weight, and further comprising a pigment present in an amount of about 0–30 parts by weight, based on a total of 100 parts by weight.

23. A process according to claim 19, wherein said chlorinated polypropylene is present in an amount of about 0.5–15 parts by weight, said graft polymer or the chlorinated product of the graft polymer is present in an amount of about 2–40 parts by weight, said solvent is present in an amount of about 40–97.5 parts by weight, and further comprising a pigment present in an amount of about 0–30 parts by weight, based on a total of 100 parts by weight.

24. A process for pre-treating synthetic materials selected from the group consisting of polyethylene, polypropylene and rubbers, comprising first applying to said synthetic material a solid state primer composition selected from the group consisting of pellets and powder at room temperature comprising:

1) a graft polymer of reactants consisting of an unsaturated dicarboxylic acid and an ethylene-ethyl acrylate copolymer or a chlorinated product of the graft polymer; and 2) a chlorinated polypropylene chosen from the list consisting of
   i) a graft polymer of an unsaturated dicarboxylic acid and a polypropylene wherein the graft polymer is substituted with chlorine and
   ii) a chlorinated polypropylene wherein the polypropylene is substituted with chlorine; and then heating said applied primer composition with a far infrared ray heater generating infrared rays having a wavelength ranging from about 3 to about 50 μm to the extent necessary to either chemically bond or fusion weld said primer composition to said synthetic material.

25. A process according to claim 24, wherein said chlorinated product of the graft polymer of an unsaturated dicarboxylic acid and an ethylene-ethyl acrylate copolymer has a chlorine content of 10–25%.

26. A process according to claim 24, wherein said graft polymer or the chlorinated product of the graft polymer is present in an amount of about 50–100 parts by weight, and further comprising a pigment present in an amount of about 0–50 parts by weight, based on a total of 100 parts by weight.

27. A process according to claim 24, wherein said chlorinated polypropylene is present in an amount of about 5–60 parts by weight, said graft polymer or the chlorinated product of the graft polymer is present in an amount of about 20–95 parts by weight, and further comprising a pigment present in an amount of about 0–30 parts by weight, based on a total of 100 parts by weight.

* * * * *